United States Patent [19]
Romeu Guardia

[11] Patent Number: 6,152,078
[45] Date of Patent: Nov. 28, 2000

[54] FEEDSTUFF METERING DEVICE

[76] Inventor: Gener Romeu Guardia, Avda. Mariano Jolonch, 6, Agramunt (Lleida), Spain, 25310

[21] Appl. No.: 09/161,456

[22] Filed: Sep. 24, 1998

[30] Foreign Application Priority Data

Oct. 15, 1997 [ES] Spain ................................ 9702134

[51] Int. Cl.[7] ........................................ A01K 5/00
[52] U.S. Cl. ........................ 119/57; 119/53; 119/36.2; 119/57.3; 119/57.7
[58] Field of Search ................... 119/57, 52.1, 53, 119/56.2, 57.2, 57.3, 57.4, 57.5, 57.7

[56] References Cited

U.S. PATENT DOCUMENTS

| | | |
|---|---|---|
| 3,174,651 | 3/1965 | Strite . |
| 3,310,033 | 3/1967 | Eichholz . |
| 3,631,841 | 1/1972 | Poirot ........................................ 119/57 |
| 3,971,340 | 7/1976 | Allen ...................................... 119/57.4 |
| 4,180,136 | 12/1979 | Jones ........................................ 177/68 |
| 4,353,329 | 10/1982 | Thibault ................................ 119/52.1 |
| 4,611,921 | 9/1986 | Patel .................................... 366/156.1 |
| 4,667,623 | 5/1987 | Swartzendruber ..................... 119/57.2 |
| 4,890,577 | 1/1990 | Maibach ................................ 119/52.1 |
| 4,987,859 | 1/1991 | Vanderzanden ....................... 119/57.7 |
| 5,474,027 | 12/1995 | Pollock .................................. 119/57.4 |
| 5,906,174 | 5/1999 | Muldoon .................................. 119/54 |

FOREIGN PATENT DOCUMENTS 7 810 082   4/1980   Netherlands .

OTHER PUBLICATIONS

Sales pamphlet: "En passend Voertransportsysteem voor iedere Stal" 1992, Dorset, Aalten, p. 1.
Sales pamphlet: "Trockenfutterund" 1997, Schauer, Prambachkirchen—whole document.

*Primary Examiner*—Peter M. Poon
*Assistant Examiner*—Yvonne R. Abbott
*Attorney, Agent, or Firm*—Darby & Darby

[57] ABSTRACT

The feedstuff metering device comprises a body connected at the top to a conveyor pipe, carrying the feedstuff from a centralized system of storage silos and which has an inner cover adjustable in position in order to vary the measured quantity, and also a rotatable rod to effect the blocking and unblocking of the discharge cover, characterized in that the metering device is provided with an upper cover detachable for maintenance purposes and in that the actuating rod of the discharge cover is linked to a driver for rotating the same by means of an intermediate engagement and disengagement device which makes it possible to disable as required the discharge of a specific feeder of a battery of feeders. The body of the metering device carries on its outer part a clamp for the attachment of index cards and the like.

7 Claims, 8 Drawing Sheets

FEEDSTUFF METERING DEVICE

The present invention refers to a feedstuff metering device which brings substantial features of novelty and inventive activity to the subject which characterizes it.

The present invention is intended especially for feedstuff metering devices of the type used on highly mechanized farms, such as pig farms and the like, where the animals are kept stabled, there being provided for each stall a feeding trough which is intended to receive the measured quantity of feedstuff for the animal or animals at the predetermined time intervals. For this purpose, installations are provided in which, from one or more centralized silos, the feedstuff is carried by means of conveying means through the inside of pipes to each of the feeding troughs of the individual stalls, there being arranged at the corresponding outlet of the feeder a metering device intended to receive the predetermined quantities of feedstuff and to feed this previously measured quantity of feedstuff to the feeding trough of the stall at the precise moment.

The present invention introduces in particular a new system for disabling the discharge of the feeders, the purpose of which will be understood on taking into account the fact that normally all the metering devices of a line are emptied at the same time by each of them being connected to a control cable which effects emptying.

Normally, in known automatic feedstuff conveying systems, provided with metering devices, after a discharge of feedstuff a new loading is initiated automatically, the metering devices being filled for the next discharge. However, this known automation system may cause problems, since, in the daily work, the case may occur of an animal being moved when the metering device is full, so that when discharge takes place subsequently the feedstuff is not consumed and deteriorates.

The present invention provides means in the metering devices for preventing the discharge of the product, which remains inside the metering device, by acting manually on a control shaft which has two positions, one of which will be regarded as the normal position and transmits the action of the cable to the metering device, while in the disconnection position the cable does not transmit any actuation to the discharge system.

The improvements introduced by the present invention into the system of disassembly of the body of the metering device will be more easily understood when account is taken of the fact that at present the elements of a metering device form a fixedly mounted assembly, so that if it is necessary to gain access to the inside thereof for repairs or maintenance it is necessary to remove the metering device from the installation and proceed to repair it by the use of tools. However, according to the present invention, provision has been made for the cover to be mounted on the metering device by means of a securing ring which can easily be disengaged, making it possible then to extract the body of the metering device and allowing access to its interior without the need to disassemble it. This constitutes a substantial advantage for permitting perfect cleaning and disinfecting, especially in the case where there are health problems. Moreover, it avoids the present drawback that when it is desired to disassemble the meter-ing devices it is necessary to withdraw them completely from the feedstuff conveying line, which means that the product outlet orifice remains open. With the new invention, the cover with its shutter remains connected in the feedstuff conveying line, since only the body of the metering device is withdrawn.

Likewise, the new metering device permits delivery in multiple phases to each of the individual stalls, the possible disabling of the discharge of the metering devices in which this function is desired, obtaining a rapid system for disassembly of the body of the metering device, and finally providing integrated index card holders which allow improved control.

The possibility of multi-phase delivery refers to the means for solving the problem which arises in the case where some of the stalls require a different feedstuff from the rest, since it is then necessary to close the inlet trap or shutter of the corresponding metering device and proceed to fill the rest. Once filled, it is necessary to close the inlet of the metering devices which are full and open that of the metering devices which are empty, proceeding to vary the type of feedstuff which the conveying circuit delivers. This operation is carried out manually at present and makes it necessary to act on all the metering devices of the line. With the application of the present invention, this awkward process is avoided by means of the design and form of connection of the closure traps of the metering devices, two metering devices being installed in each feeding centre or stall in such a manner that the control traps are connected by a control cable in each of the stalls, being located in reverse position in each of the metering devices which make up the pair of metering devices of the same stall, so that there is always one trap open and the other closed, their positions being reversed by the actuation of the control cable. In this manner it will be possible to have available two feeders which, operating in reverse phase, make it possible to combine the operation of one of them with the stopped state of the other, and vice versa. The system likewise provides for the installation of traps of the same pair of feeders in the same direction, where required, or the possibility of disconnection of the cable, acting manually on them.

For greater understanding of the present invention, explanatory, but nonlimiting drawings are provided of an exemplary embodiment thereof.

Figure 1:
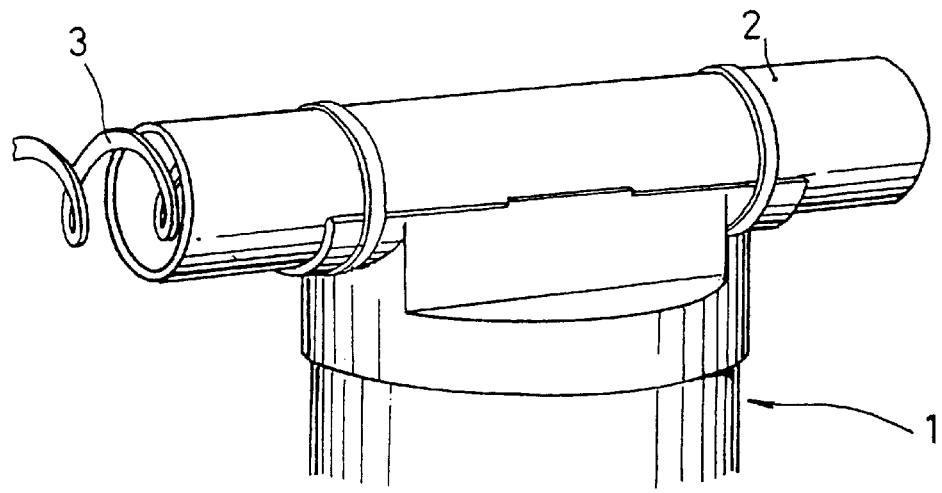
FIGS. 1 and 2 are diagrammatic views showing the arrangement of the feeder device with respect to a metering device and the arrangement of an assembly of metering devices in different stalls for animals of a farm in relation to a central silo.
Figure 2:
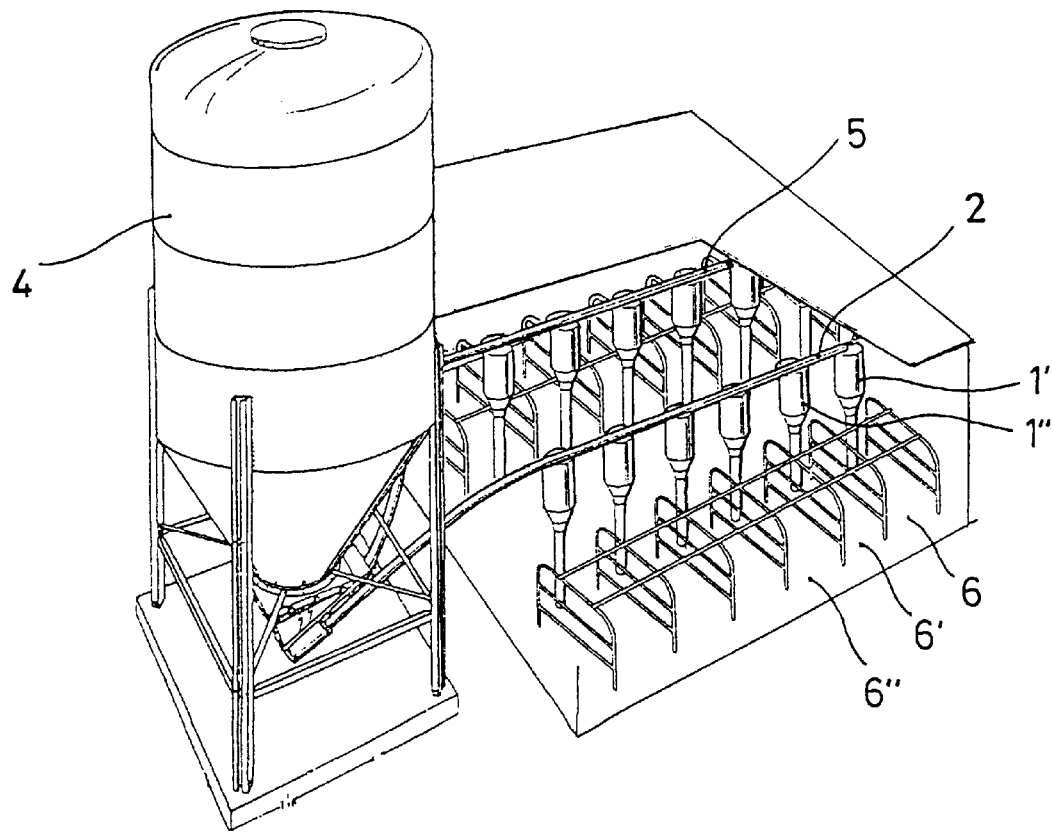
Figure 3:
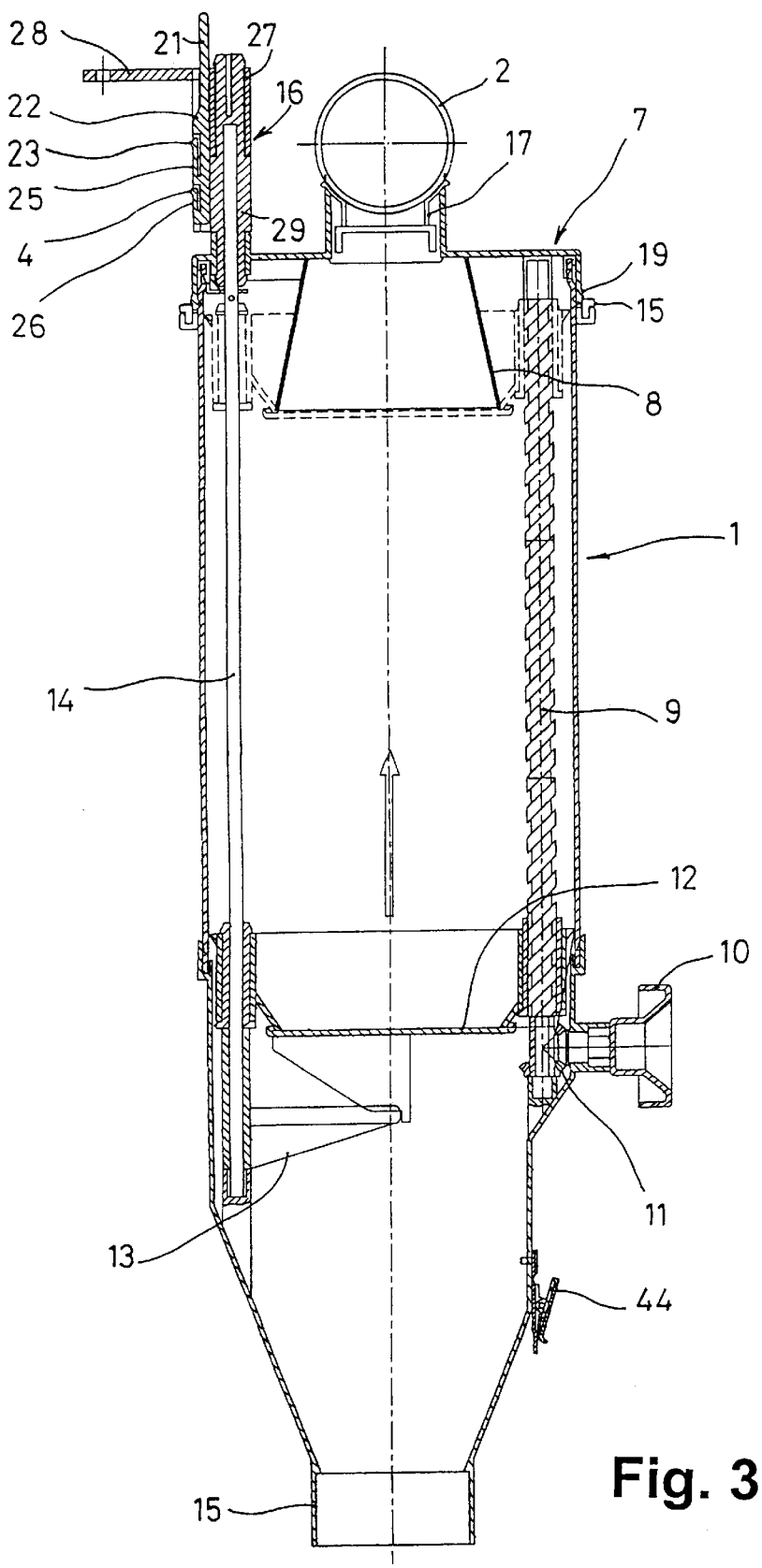
FIG. 3 shows the complete longitudinal section of a metering device which incorporates the present invention.
Figure 4:
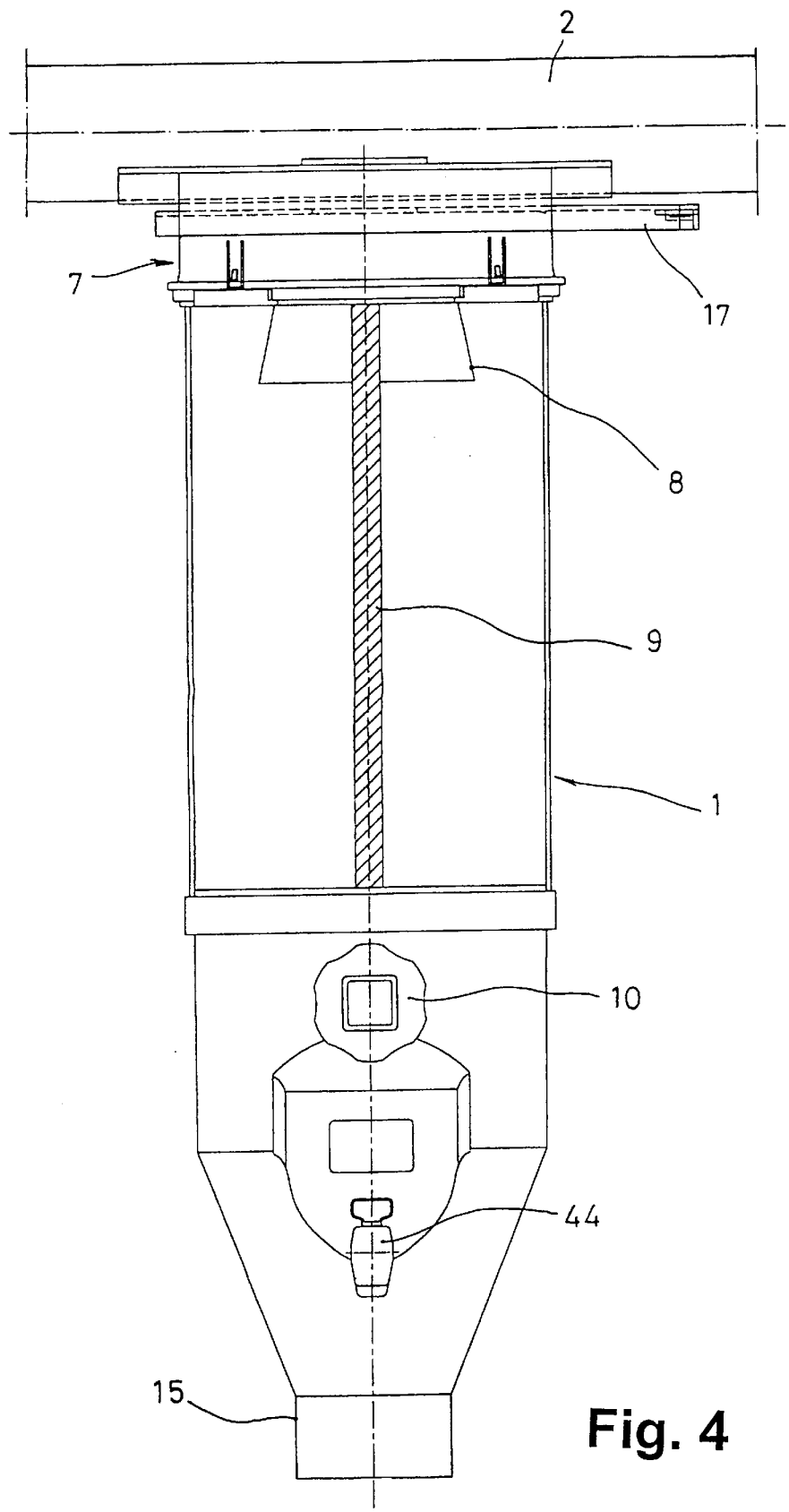
FIG. 4 is a view in elevation with partial sections of the same metering device.

The present invention is intended for feeders indicated diagrammatically by the reference number 1 in FIG. 1, and which receive by way of a pipe 2 and a conveying means 3 the feedstuff coming from a central silo or silos 4, providing a general arrangement as shown in FIG. 2, in which one or more supply pipes such as 2 and 5 deliver the feedstuff from the central silo 4 to multiple metering devices such as 1', 1" . . . arranged in the different stalls 6, 6', 6" . . . which form part of a modern farm of the mechanized type.

According to the present invention, the feeder 1 comprises a detachable upper cover 7, which fits over the inner cone of the body of the metering device 1, which determines the minimum quantity to be measured out and which is independent of the cover and is detachable with respect to the body of the metering device, the metering device having a screw 9 which, actuated by an external control 10 and an assembly of gear wheels 11, makes it possible to vary the height of the cover 12 and with it the quantity of feedstuff, received from the supply pipe 2, which will be delivered to the feeding trough on opening of the cover 12 by disengagement of the bracket 13 actuated by the rotation of the rod 14. Once the cover 12 is open, the feedstuff will pass towards the outlet opening 15 and therefore to the feeding trough of the required stall. According to the invention, the rod 14 is actuated by an upper coupling and uncoupling assembly 16 which makes it possible to effect the disengagement of the rod 14, so that the discharge is disabled, on acting manually on the desired metering devices.

Figure 7:
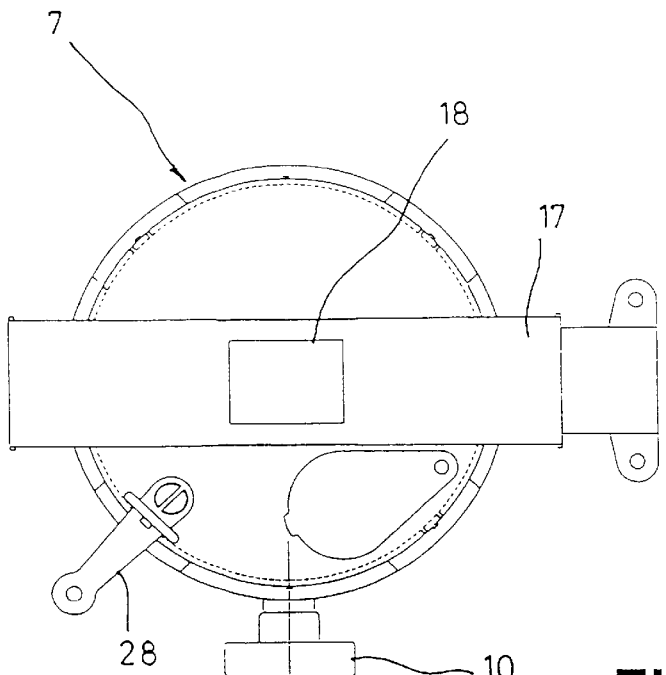
FIG. 7 shows a plan view of the actual metering device.
Figure 8:
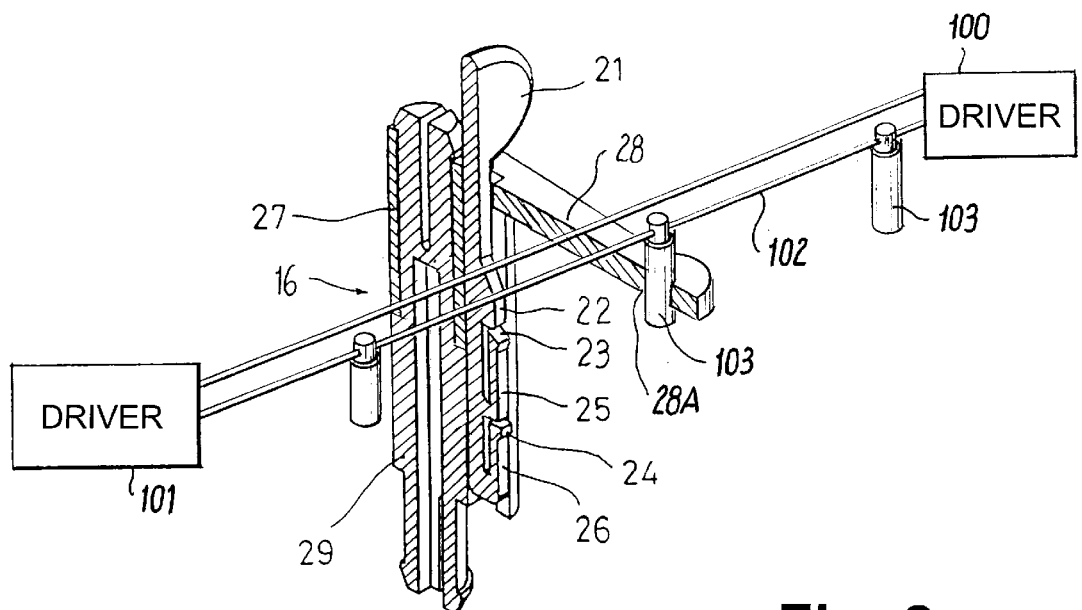
FIGS. 8, 9, 10 and 11 are different views in perspective and in section of the engagement mechanism of the rod which controls the discharge of the feeder.
Figure 9:
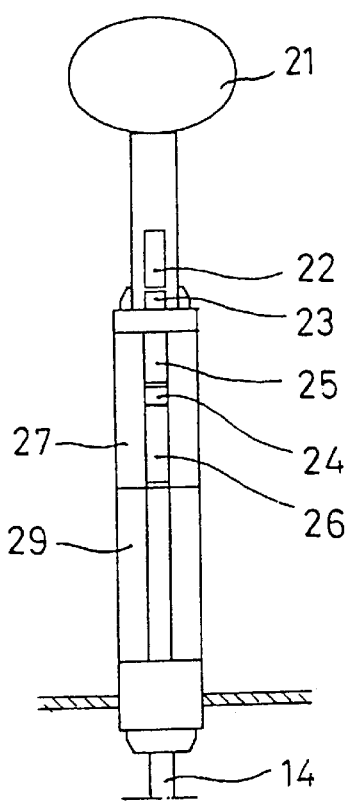
Figure 10:
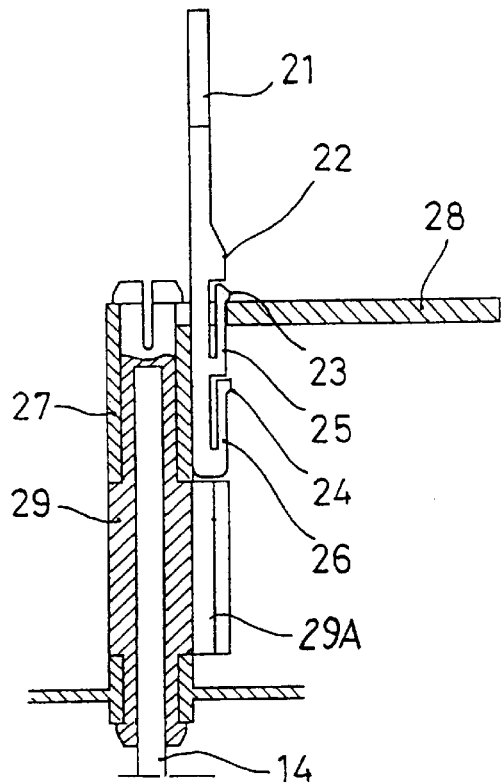

In order to control the entry of feedstuff from the pipe 2 to the inside of the metering device, the latter has at the top a shutter or movable flap 17 provided with a central opening 18, FIG. 7, and which is displaceable axially, providing alternative opening or closure positions to permit the passage of feedstuff to the metering device or to disconnect the said supply. The part 21 is designed in such a way as to permit easy viewing of the state of the engagement and disengagement system.

Figure 5:
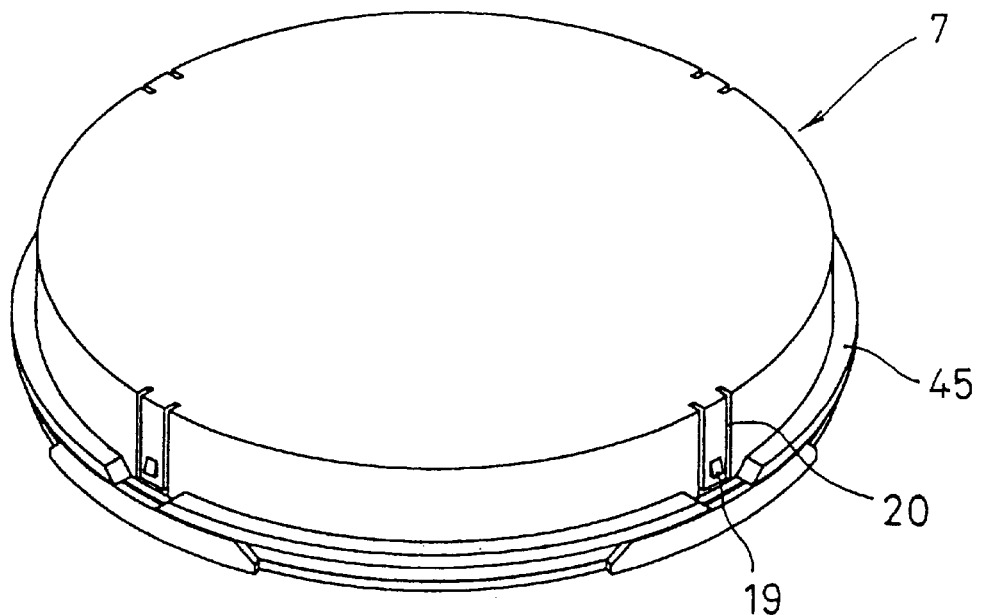
FIGS. 5 and 6 are diagrammatic views, in perspective and with a diametral section, of the cover of the metering device.
Figure 6:
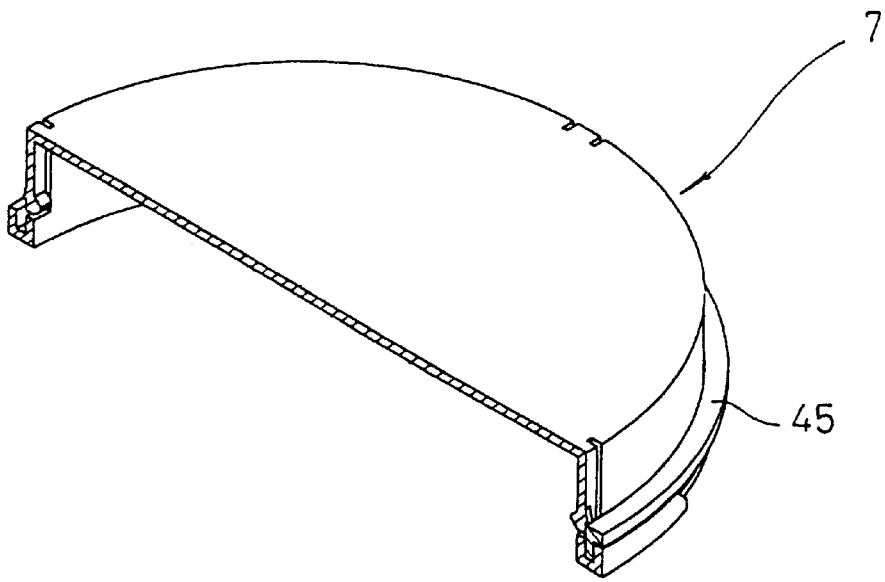
Figure 13:
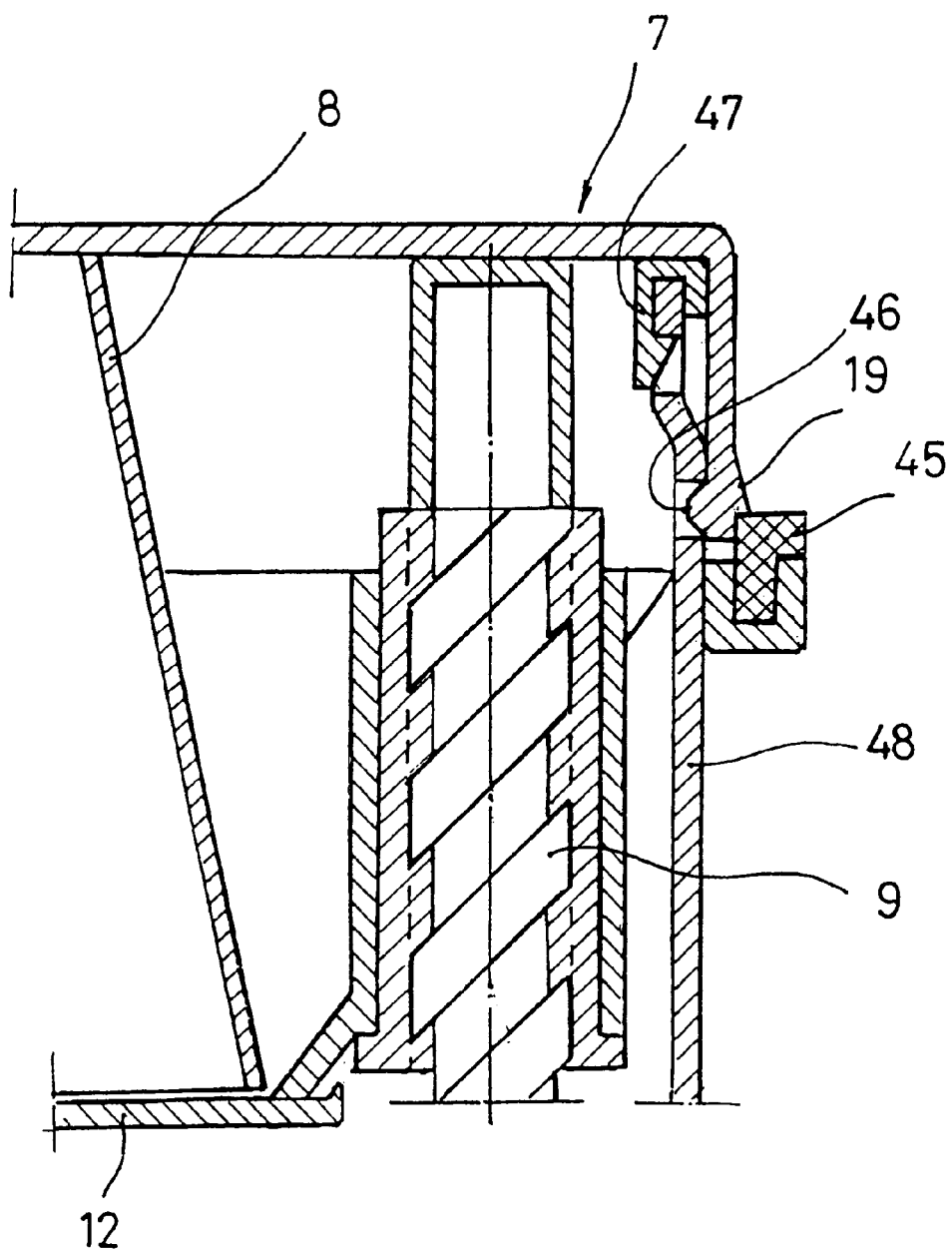
FIG. 13 shows a detail in section of the upper end of the screw for adjustment of the quantity to be measured out.

The cover 7, which has been shown very diagrammatically and incompletely in FIGS. 5 and 6, can be detached by the combination of the action of a rotatable ring 45 thereon, which has discontinuities with ramps capable of acting together with the projections 19 of the limbs 20, provided with a certain elasticity, of the cover itself, so that the pressure of the ring against the limbs causes the engagement of its inner projections 46, FIG. 13, in corresponding openings of the body of the metering device; and the ring 45 is in turn retained by the projections 19.

The inner cone 8 has, joined by radial ribs which are not shown, mounting means 47, FIG. 13, for its detachable fixing on the upper end of the body 48 of the metering device, which means are superposed on and clasp the upper edge of the body, being retained by means of lower projections which are introduced into each of the openings of the body. The mounting means 47 may vary in number or form a continuous inverted channel completely surrounding the upper mouth of the body 48 of the metering device. By means of this arrangement it is possible to effect rapid disassembly of the cover in order to allow easy maintenance, cleaning and disinfection of the metering device, and also to permit disassembly of the inner cone independently of the cover.

Figure 11:
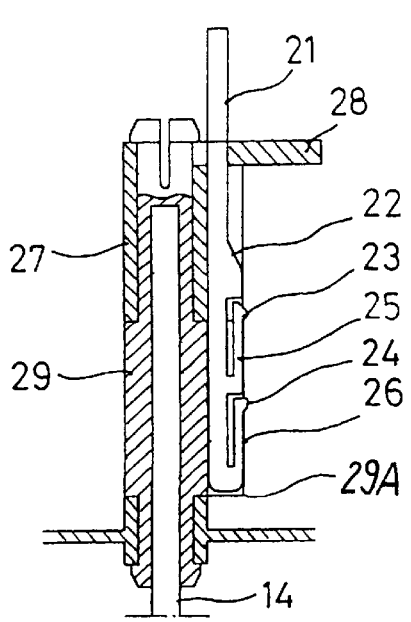
Figure 12:
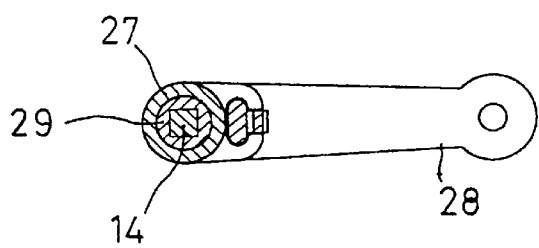
FIG. 12 shows a plan view of the actual device.

The assembly 16 for engagement and disengagement of the control rod for operation or disabling of the metering device comprises a manual handle 21 provided with a projection with ramp 22 and with two claws 23 and 24 integral with respective elastic appendages 25 and 26, being able to slide inside the surrounding part 27, carrying the control lever 28, and inside the sleeve extension 29A of sleeve 29 capable of receiving inside it the rod 14, FIG. 1, and FIGS. 9 to 11. By means of this arrangement it is possible to disable, if required, any of the metering devices, by raising the handle 21 above extension 29A, FIG. 10, in which position the rotation of the lever 28 does not cause rotation of the sleeve 29. FIG. 11 shows the handle 21 lowered, that is to say, coupling the surrounding part 27 and its lever 28 with the sleeve 29 through the extension 29A, in such a manner that the rotation of the lever produces rotation of the sleeve and, therefore, that of the rod 14, disengaging or liberating the bracket 12.

Drivers 100, 101 may be used for moving the levers 28. A cable 102 is connected between the drivers and may be moved forwards and backwards depending upon which one of the drivers in energized. The cable 101 is connected to each one of levers 28 in a line by depending pins 103 received in the openings 28A of the lever 28. Thus, alternate movement of the cable forward and backwards causes corresponding rotation of the lever 28 and, therefore, the control rod 14.

In FIG. 13 can be seen the detail of the upper part of the screw 9 and of the arrangement of the detachable cover.

Figure 14:
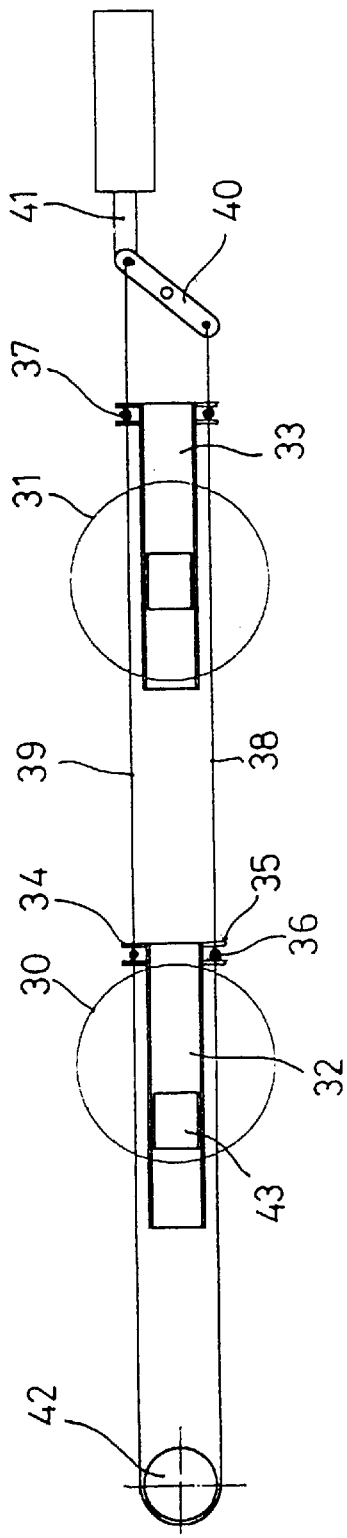
FIGS. 14 and 15 are diagrammatic views of the arrangement provided by the present invention for multi-stage feeding.
Figure 15:
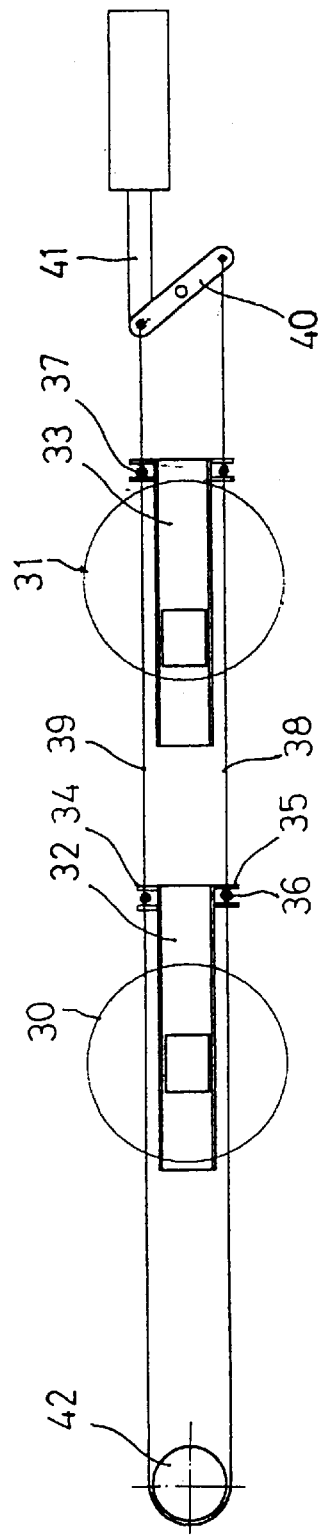

In FIGS. 14 and 15 can be seen the arrangements for multi-phase delivery in accordance with the present invention. According to these, two feeders 30 and 31 are arranged in the same feeding stall, each of them having its respective movable trap such as 32 and 33. Each of the said traps has two lateral lugs such as the lugs 34 and 35 of the trap 32, capable of receiving the stops 36 or 37 arranged on the opposed strands 38 and 39 of a single control cable, the ends of which are fixed to a rocker arm 40 coupled to the actuating rod 41 and which at the other end are guided on the pulley 42. By means of this arrangement, since the opening 43 provided in each of the shutters or flaps 32 has only one position for passage of the feedstuff which customarily corresponds to the central position with respect to the body of the feeder, different positions may be obtained such as those shown in FIGS. 14 and 15. In the first of these it will be observed that the shutter 32 is offcentre and therefore corresponds to a closure position for the supply of the metering device 30. On the other hand, the shutter or flap 33 is centred with respect to the metering device 31, corresponding to a supply position.

In FIG. 15 has been shown the position in which the shutter 32 is open and the shutter 33 closed, that is to say, the reverse position to that corresponding to FIG. 14.

A clamp 44 incorporated in the metering device allows correct control of each animal. This makes it possible to solve the problem which arises in current operations, where the herdsman does not know where to place the control sheets for each animal, so that the latter are torn or lost in many cases.

It will therefore be understood that by means of the arrangements indicated it becomes possible to obtain the advantages indicated initially in the metering device which is the object of the invention.

What is claimed is:

1. Feedstuff metering device, of the type which has a body of the metering device connected at the top to a pipe provided with a conveyor device, carrying the feedstuff from a centralized system of storage silos, and wherein said body has an inner cover adjustable in position to vary the volume of the feedstuff receiving space in order to vary the measured quantity of feedstuff, and a rotatable rod to effect the blocking and unblocking of the inner cover, characterized in that the metering device is provided with a detachable upper cover for maintenance, cleaning and disinfection, drive means for rotating said rod between said blocking and unblocking positions, and an intermediate engagement and disengagement device for selectively connecting and disconnecting said drive means to said rod for disabling, as required, the discharge of a specific feeder of a battery of feeders.

2. Feedstuff metering device, according to claim 1, characterized in that the detachable cover of the metering device is engaged in a fixed position by means of a ring rotatable on its own axis which bears open regions provided with ramps, which cover has, in its inner part and opposite projections, means for securing the cover to the body of the metering device, these means and the projections being arranged in lateral regions of the cover which are provided with a certain elasticity.

3. Feedstuff metering device, according to claim 2, characterized in that the lateral regions of the cover which are provided with greater elasticity comprise short parallel sections which separate a tongue provided with the engagement projections.

4. Foodstuff metering device according to claim 1, characterized by the arrangement of two feeders in a single stall, each of said feeders having a feedstuff inlet control shutter on said pipe, and a reversed engagement system connecting said inlet control shutters so that one of the shutters is open the other is closed.

5. Feedstuff metering device according to claim 4, characterized in that the shutters are capable of being actuated by one or other of two strands of a control cable, a rocker arm having respective ends, the free ends of said cables being connected to a respective end of said rocker arm, an actuating lever for operating said rocker arm, whereby movement of the rocker arm causes alternate opening and closure positions of the shutters of two metering devices of the same stall.

6. Feedstuff metering device, according to claim 1, characterized in that it includes in the outer part of the body, in its lower front region, a built-in clamp adapted to receive a control index card.

7. Feedstuff metering device according to claim 1, in which said engagement and disengagement device comprises a housing having a radially extending actuating lever adapted to be connected to said drive means, and a projection slidable between a first and a second position, a sleeve rotatably received within said housing and connected to said rod, and an extension on said sleeve, said projection engageable with said extension when said extension is in said first position to connect together said lever and said sleeve, and being disengageable from said extension when said projection is in said second position to disconnect said sleeve from said lever.

\* \* \* \* \*